United States Patent
Claringburn et al.

(10) Patent No.: US 6,697,188 B2
(45) Date of Patent: Feb. 24, 2004

(54) RADIATION POWER EQUALIZER

(75) Inventors: Harry R Claringburn, Nottingham (GB); Martin G Baker, Nottingham (GB); Michael Sharratt, Nottingham (GB)

(73) Assignee: Marconi Communications Limited, Coventry (GB)

(*) Notice: Subject to any disclaimer, the term of this patent is extended or adjusted under 35 U.S.C. 154(b) by 230 days.

(21) Appl. No.: 09/863,591

(22) Filed: May 15, 2001

(65) Prior Publication Data

US 2002/0015553 A1 Feb. 7, 2002

(30) Foreign Application Priority Data

May 18, 2000 (GB) .............................. 0011851

(51) Int. Cl.[7] .................................................. H01S 3/00
(52) U.S. Cl. .............................. 359/337.1; 359/337.13
(58) Field of Search ........................ 359/337.1, 337.13, 359/124, 349

(56) References Cited

U.S. PATENT DOCUMENTS

| | | | |
|---|---|---|---|
| 5,015,057 A | * 5/1991 | Rumbaugh et al. | 350/96.15 |
| 5,675,432 A | * 10/1997 | Kosaka | 359/341 |
| 5,933,270 A | 8/1999 | Toyohara | |
| 6,058,226 A | 5/2000 | Starodubov | |

FOREIGN PATENT DOCUMENTS

| | | |
|---|---|---|
| EP | 0 734 129 A2 | 9/1996 |
| EP | 0 959 579 A2 | 11/1999 |

OTHER PUBLICATIONS

*Wavelength–Division–Multiplexing Technology for Broadband Lightwave Communication Systems*, Fujitsu Sci. Tech. J., 32, 1 pp. 36–45, Jun. 1996, Hiroshi Onaka, et al.

* cited by examiner

*Primary Examiner*—Mark Hellner
(74) *Attorney, Agent, or Firm*—Kirschstein, et al.

(57) ABSTRACT

The invention provides a radiation power equalizer for an optical communication system, the equalizer characterized in that it includes: (a) an optical demultiplexer (300) for partitioning information-bearing radiation received at the equalizer into one or more radiation components corresponding to wavelength division multiplexed communication channels of the system; (b) a liquid crystal cell array (310) for selectively transmitting or attenuating said one or more radiation components; (c) an optical multiplexer (330) for combining one or more of the radiation components transmitted or attenuated through the cell array (310) to provide combined radiation; (d) a transmitter erbium-doped fiber amplifier (70) coupled to a PIN diode detector array (120) for measuring radiation power present in said one or more of the radiation components included in the combined radiation and generating one or more corresponding component radiation power indicative signals; and (e) a control module (130) for receiving said one or more power indicative signals from the array (120) and controlling attenuation provided by the cell array (310) so that the radiation components included in the combined radiation are substantially of mutually similar radiation power. Action of the cell array (310) ensures that radiation components present in the combined radiation are mutually power matched, thereby assisting to alleviate power hogging by radiation components having relatively greater radiation power in devices such as erbium-doped fiber amplifiers (EDFAs).

18 Claims, 1 Drawing Sheet

RADIATION POWER EQUALIZER

FIELD OF THE INVENTION

The present invention is concerned with a radiation power equalizer for optical communication systems. The invention also relates to a method of equalizing radiation power within such systems.

BACKGROUND OF THE INVENTION

Optical communication systems conventionally communicate information by conveying information-bearing optical radiation having a wavelength in the order of 1.5 µm. Such systems often now employ wavelength division multiplexing (WDM). When WDM is used, the optical radiation comprises one or more radiation components corresponding to channels where each component is modulated with associated communication traffic. Thus, the radiation is effectively partitioned into a discrete series of modulated radiation components.

Optical fibre waveguides incorporated into the communication systems are used to guide the radiation therearound. Attenuation occurring in the waveguides and associated optical devices connected thereto, for example add/drop multiplexers, necessitates the inclusion of optical amplifiers in series with the waveguides which improve signal-to-noise ratio by boosting radiation levels. Conventional optical amplifiers currently employed in optical communication systems are based on erbium-doped fibre amplification technology. Such amplifiers exhibit a non-linear amplitude-gain response and finite pumping power. As a consequence of this response, when radiation comprising a number of modulated radiation components is input to the amplifiers, it is important that the amplitudes of the radiation components are mutually similar otherwise the amplifiers will accentuate components of relatively greater radiation power in preference to components of relatively lesser power. Such accentuation becomes a serious issue when radiation passes through a number of cascaded erbium-doped fibre amplifiers (EDFAs) in the communication systems, especially when optical devices in the systems exhibit wavelength dependent transmission responses which accentuate certain radiation components more than others.

In conventional optical communication systems, matching of WDM radiation component amplitudes, namely channel leveling, is achieved by monitoring radiation component amplitudes at receiving locations where the radiation components are received and providing feedback instructions therefrom to transmitting locations where the radiation components are generated to adjust relative amplitudes of the components thereat so that the components are of similar power at the receiving locations. Such matching does not take into account variations in radiation component amplitudes at intermediate points in the systems between the transmitting locations and receiving locations at which EDFAs for radiation regeneration purposes are included. There therefore arises a potential problem that EDFAs at intermediate points can be supplied with radiation whose associated radiation components are not mutually similar in amplitude.

The inventors have appreciated that it is feasible to achieve channel leveling at the intermediate points in the systems using appropriately compact optical sub-systems capable of selectively attenuating or amplifying specific radiation components thereat. Moreover, the inventors have further appreciated that these aforementioned intermediate points can be add/drop multiplexers in a ring-based optical fibre waveguide network. Add/drop multiplexers are conventionally regarded as devices where diversion and addition of radiation components corresponding to specific channels is implemented, the diversion and addition of radiation components being achieved by way of switching operations using bi-state optical switching devices.

SUMMARY OF THE INVENTION

Thus, according to a first aspect of the present invention, there is provided a radiation power equalizer for an optical communication system, the equalizer characterized in that it includes:
(a) filtering means for partitioning information-bearing radiation received at the equalizer into one or more radiation components corresponding to wavelength division multiplexed communication channels of the system;
(b) liquid crystal attenuating means for selectively transmitting or attenuating said one or more radiation components;
(c) combining means for combining one or more of the radiation components transmitted or attenuated through the attenuating means to provide combined radiation;
(d) monitoring means for measuring power present in said one or more of the radiation components included in the combined radiation and generating one or more corresponding radiation component power indicative signals; and
(e) controlling means for receiving said one or more power indicative signals from the monitoring means and controlling attenuation provided by the attenuating means so that the radiation components included in the combined radiation are substantially of mutually similar power.

The invention provides the advantage that equalizer is capable of substantially mutually matching radiation power in radiation components output from the combining means so that such components subsequently do not cause power hogging effects in optical devices, for example in subsequent erbium-doped fibre amplifiers (EDFAs).

Such power hogging can cause diminution of relatively less powerful radiation components and accentuation of relatively more powerful radiation components, such disparity of power between radiation components potentially giving rise to increased data error rate and degraded signal-to-noise ratio.

In the context of the present invention, radiation components are substantially of similar mutual power when their respective powers are within a 20 dB error band, namely that the power difference between the weakest and most powerful radiation components in the radiation output from the combining means is not greater than 20 dB. In practice, the equalizer of the invention is capable of controlling radiation component power to within an error margin of 10 dB, preferably to within an error margin of 1 dB.

Thus, the controlling means is advantageously operable to mutually match the power of the one or more radiation components present in the combined radiation to within an error margin of 10 dB or less. Preferably, the controlling means is operable to mutually match the magnitudes of the one or more radiation components present in the combined radiation to within an error margin of 1 dB or less.

When implementing the equalizer in a communication system, it is beneficial that the filtering means is operable to partition the radiation received at the equalizer into spatially separated raylets, and the attenuating means preferably includes an array of liquid crystal cells, each cell corresponding to an associated raylet and operable to provide selective attenuation or transmission of the raylet. Partitioning the received radiation into spatially separated raylets eases the task of controlling the radiation power of each raylet selectively.

When the equalizer is included within an add/drop multiplexer of a communication system, it is advantageous that the equalizer includes dropping means for selectively diverting at least part of the one or more radiation components present in the radiation received by the filtering means, the part for output from the equalizer. Such diversion of at least part of the one or more radiation components enables the add/drop multiplexer to drop communication channels at the multiplexer, for example for conveying to clients connected to the add/drop multiplexer.

In a similar manner to the dropping means, the equalizer preferably includes adding means for adding additional radiation components to the combined radiation output from the combining means, the additional components and the combined radiation for output from the equalizer into the system. Inclusion of the dropping means and adding means enables the equalizer to both drop and add communication channels at the add/drop multiplexer into which it is incorporated. Conveniently, the controlling means is operable to control the adding means so that the additional radiation components and the one or more radiation components included in the combined radiation are mutually power matched to within an error margin of 10 dB; it is advantageous that the equalizer acts upon both radiation components transmitted through the attenuation means as well as components added through the adding means so that subsequent power hogging is unlikely to arise on account of the presence of the additional components.

When determining radiation power of radiation components within the equalizer for control purposes, it is advantageous that the monitoring means includes optical filtering means for partitioning radiation received thereat from at least one of the combining means and the adding means into radiation components, and an array of photodetectors for measuring radiation power present in each of the components and generating one or more corresponding output signals indicative of the radiation power present in the radiation components, the one or more output signals for use by the controlling means for controlling the attenuating means. There is thereby provided a parallel measurement of component radiation powers which can be implemented at relatively high speed but entails the relatively complex filtering means and the array of detectors.

Where relatively slower rate monitoring of radiation power of radiation components can be tolerated, it is preferable that the monitoring means includes tunable optical filtering means for serially selecting radiation components present in radiation received thereat from at least one of the combining means and the adding means, and a photodetector for measuring radiation power present in the selected series of radiation components and generating one or more corresponding output signals indicative of the radiation power present in the selected series, the one or more output signals for use by the controlling means for controlling the attenuating means. Such a serial manner of power measurement results in simplified hardware for the equalizer.

In operation, combining information-bearing radiation components of coincident wavelength inevitably results in data corruption within the equalizer. It is therefore beneficial that the attenuating means is operable to block radiation components propagating therethrough whose wavelengths are coincident with those of radiation components added to the combined radiation by the adding means.

Conveniently, for purposes of generating the additional radiation components, the adding means incorporates one or more modulated distributed feedback lasers for generating the one or more radiation components for adding to the combined radiation.

When implementing the equalizer, the filtering means associated with the attenuating means and the optical filtering means of the monitoring means are preferably implemented by using Bragg grating filters. Such grating filters can potentially provide relatively low cost compact practical assemblies.

When the equalizer is, for example, functioning as an add/drop multiplexer, it is preferable that the equalizer drops and adds appropriate amounts of radiation. In practice, it is found convenient that the equalizer is operable to divert in a range of 5 to 95% of radiation received thereat to the dropping means. Likewise, it is also convenient that the equalizer includes coupling means for coupling in a range of 5% to 95% of the combined radiation and in a range of 5% to 95% of the additional radiation into radiation for output from the equalizer to the system.

In a second aspect of the present invention, there is provided an add/drop multiplexer for an optical communication system, the multiplexer including a radiation power equalizer according to the first aspect of the invention.

In a third aspect of the present invention, there is provided a communication system including an add/drop multiplexer according to the second aspect of the invention.

According to a fourth aspect of the present invention, there is provided a method of equalizing radiation power in a radiation power equalizer, the method characterized in that it includes the steps of:
(a) receiving information-bearing optical radiation at the equalizer;
(b) partitioning the radiation into radiation components corresponding to communication channels;
(c) selectively attenuating one or more of the radiation components in liquid crystal attenuating means;
(d) combining radiation components transmitted or attenuated through the attenuating means to provide combined radiation;
(e) measuring the combined radiation using monitoring means to determine radiation power present in the one or more radiation components included in the combined radiation and generating one or more corresponding component radiation power indicative signals; and
(f) controlling attenuation provided by the attenuating means in response to the one or more power indicative signals so that radiation components present in the combined radiation are substantially of similar mutual power.

When controlling attenuation provided by the liquid crystal attenuating means, it is preferable to control such that, in step (f), the one or more radiation components present in the combined radiation are mutually power matched to within an error margin of 10 dB.

BRIEF DESCRIPTION OF THE DRAWING

An embodiment of the invention will now be described, by way of example, with reference to the following drawing in which.

DETAILED DESCRIPTION OF THE PREFERRED EMBODIMENT

Figure 1:
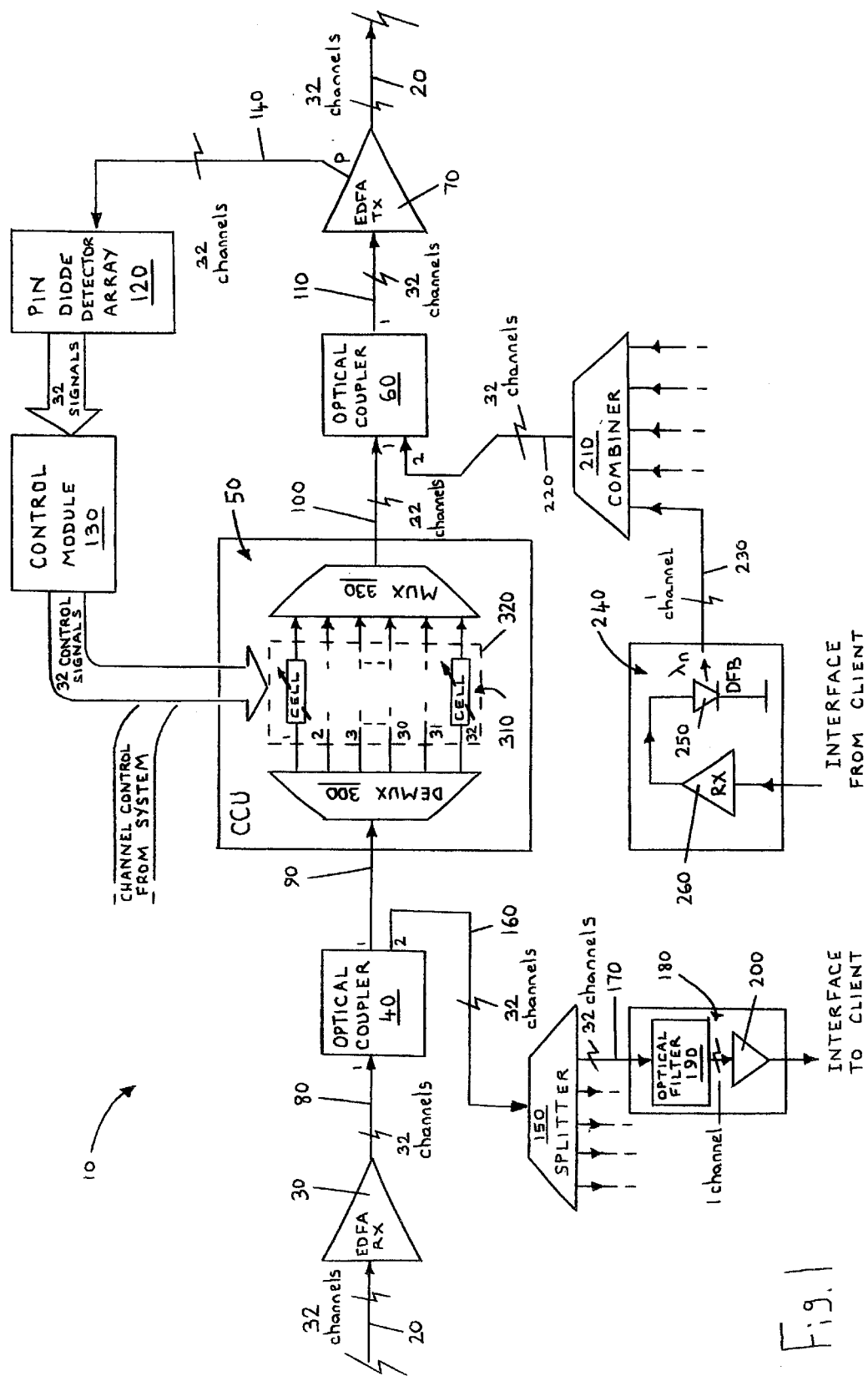
FIG. 1 is a schematic diagram of an add/drop multiplexer including a radiation power equalizer according to the invention.

In FIG. 1, there is shown an add/drop multiplexer indicated generally by 10 incorporated into an optical communication system (not shown) including at least one optical fibre waveguide ring comprising an optical fibre waveguide 20. The multiplexer 10 includes a receiver erbium-doped fibre amplifier (EDFA) 30, a first optical coupler 40, a channel control unit (CCU) indicated by 50, a second optical coupler 60 and a transmitter EDFA 70. The waveguide 20 is connected at a first end thereof to an optical input port of the receiver EDFA 30; likewise, the waveguide 20 at a second end thereof is connected to an optical output port of the transmitter EDFA 70. In the system, the waveguide 20 has other add/drop multiplexers and similar devices included within its optical path from its first and second ends. An optical output port of the receiver EDFA 30 is coupled through an optical fibre waveguide 80 to a first optical input port of the first coupler 40. Similarly, a first optical output port of the coupler 40 is connected through an optical fibre waveguide 90 to an optical input port of the CCU 50. The CCU 50 includes an optical output port which is coupled through an optical fibre waveguide 100 to a first optical input port of the second coupler 60. Finally, the coupler 60 comprises an optical output port which is connected through an optical fibre waveguide 110 to an optical input port of the transmitter EDFA 70.

The multiplexer 10 additionally comprises a PIN diode detector array 120 and a control module 130. The transmitter EDFA 70 includes an auxiliary optical output port P for monitoring purposes which is coupled through an optical fibre waveguide 140 to an optical input port of the detector array 120; in operation, a portion of optical radiation output from the transmitter EDFA 70 into the fibre waveguide 20 is output at the auxiliary output P. The detector array 120 includes an electrical output providing electrical signals corresponding to energy in radiation components conveyed through the waveguide 140 and received at the detector array 120. The control module 130 is connected to receive the electrical signals and process them to generate electrical control signals which are output at electrical outputs of the module 130; the electrical outputs are connected to corresponding attenuation controlling inputs of the CCU 50.

The multiplexer 10 further comprises an optical splitter 150 whose optical input port is connected through an optical fibre waveguide 160 to a second optical output port of the first coupler 40. Moreover, the splitter 150 also includes in the order of twelve optical output ports, one of which is coupled through an optical fibre waveguide 170 to an optical input port of a receiver unit indicated by 180. The splitter 150 in operation functions as a multiway radiation splitter and does not provide any form of optical filtration at radiation wavelengths of interest.

The receiver unit 180 includes an optical bandpass filter 190 operable to transmit only a specific radiation component in radiation received thereat, the component corresponding to a specific communication channel. The filter 190 is operable to transmit the component to an interfacing unit 200 operable to condition the specific radiation component into a suitable form for one or more clients (not shown) connected to the add/drop multiplexer 10. The interfacing unit 200 can, for example, convert the specific radiation component into a corresponding electrical signal by detection and output this signal to the one or more clients. Alternatively, the interfacing unit 200 can amplify the specific radiation components and then output the component when amplified to the one or more clients.

The multiplexer 10 additionally comprises an optical combiner 210 whose optical output is coupled through an optical fibre waveguide 220 to a second optical input port of the second coupler 60. The optical combiner 210 includes in the order of twelve optical input ports, one of which is connected through an optical fibre waveguide 230 to an optical output port of a transmitter unit 240. In operation, the combiner 210 functions as a multiway coupler and does not provide any form of wavelength-selective filtration at wavelengths of interest.

The transmitter unit 240 comprises a tunable distributed feedback (DFB) laser 250 and an associated interfacing amplifier 260. An input of the amplifier 260 is connected to one or more clients (not shown) using the system and receives either electrical or optical information traffic from the one or more clients. An output of the interfacing amplifier 260 is connected to a modulation input of the DFB laser 250 for laser radiation amplitude modulation purposes.

The first coupler 40 is operable to couple from its optical input port so that a portion of radiation input thereat is coupled to its first output port and substantially a remaining portion of the radiation input is coupled to its second output port. The second coupler 60 operates in a similar manner to the first coupler 40 such that a portion of radiation output at the output port of the second coupler 60 derives from radiation input at the first input port and a remaining portion derives from radiation input at the second input port. The portions and remaining portion for each coupler add up to substantially 100%, the portions and remaining portions being substantially in ranges of 5% to 95% and 95% to 5% respectively.

The CCU 50 is a proprietary sub-system and operates in a manner generally similar to a frequency-selective optical switch as described in a U.S. Pat. No. 5,414,540 which is herein incorporated by reference. The CCU 50 incorporates an input optical demultiplexer 300 implemented using Bragg grating technology, an array of liquid crystal cells indicated by 310 and shown included within a dashed line 320, and finally an output optical multiplexer 330. Within the CCU 50, the demultiplexer 300, the array 310 and the multiplexer 330 are optically coupled using free-space optical paths which results in a low minimum attenuation factor in the order of 6 dB from the input optical port to the output optical port of the CCU 50.

When the CCU 50 is operational, radiation comprising a number of radiation components corresponding to associated communication channels applied to the optical input port of the CCU 50 propagates to the demultiplexer 300 which separates the radiation into a number of raylets, each raylet corresponding to an associated radiation component and hence communication channel. The raylets propagate from the demultiplexer 300 to corresponding cells of the array 310 and therethrough to the multiplexer 330 which combines the raylets received thereat to provide output radiation which emerges from the optical output port of the CCU 50. By selectively controlling the liquid crystal cells of the array 310, radiation components corresponding to specific channels can be selectively transmitted or blocked from the input port to the output port of the CCU 50. In the aforementioned U.S. Pat. No. 5,414,540, the switch described therein is for switching radiation components, namely either fully transmitting them or blocking them completely; such switching is appropriate where the switch is used for selectively diverting particular radiation components, for example in an optical telephone exchange. The inventors have appreciated that the CCU 50 in the multiplexer 10, although the CCU 50 employs similar technology to the aforesaid switch, is not only capable of being used for selectively blocking or transmitting components of radiation propagating therethrough but also capable of being used to selectively attenuate the components when attenuation is required. Such an attenuation mode of operation is, for example, not envisaged in the aforesaid US patent. The inventors have further appreciated that selective attenuation provided by the CCU 50 can be applied to provide leveling of radiation component amplitudes in the optical communication system. The CCU 50 exhibits a characteristic that the liquid crystal cells of the array 310 provide an optical transmission therethrough which can be controlled by the control signals output from the control module 130. In practice, attenuation through the CCU 50 is 6 dB when the liquid crystal cells are optically clear and at least 40 dB when the cells are driven to be reflective. Thus, the cells are each capable of providing an optical attenuation therethrough which is continuously variable over a range of at least 30 dB. The CCU 50 is designed to be capable of selectively attenuating 32 channels having radiation components of nominally 1.5 $\mu$m wavelength, the channels having a mutual channel spacing of 100 GHz corresponding to a wavelength spacing in the order of 0.8 nm.

Operation of the add/drop multiplexer 10 will now be described with reference to FIG. 1. Radiation propagating along the waveguide 20 comprises up to thirty-two radiation components corresponding to up to thirty-two information-bearing communication channels; the components have mutually different wavelengths at channel wavelength spacings of substantially 0.8 nm, namely corresponding to a frequency spacing of substantially 100 GHz. The radiation is received at the input port of the receiver EDFA 30 which amplifies the radiation and outputs corresponding amplified radiation at the output port of the EDFA 30. The amplified radiation propagates along the waveguide 80 to the first coupler 40 which diverts a first portion of the amplified radiation through the waveguide 160 to the splitter 150, and a remaining second portion of the amplified radiation through the waveguide 90 to the input port of the CCU 50. The first portion of the amplified radiation received at the splitter 150 is split therein twelve ways, namely approximately 8% of the amplified radiation received at the splitter 150 propagates along the waveguide 170 and is received at the optical filter 190. The filter 190 filters amplified radiation received thereat and transmits a radiation component present in the amplified radiation to which the filter 190 is tuned. The radiation component propagates from the filter 190 to the interfacing unit 200 which conditions the radiation component then outputs it in conditioned form as at least one of an electrical signal and optical radiation to the one or more clients connected to the add/drop multiplexer 10.

Amplified radiation received at the CCU 50 passes to the demultiplexer 300 whereat its radiation components are split into spatially separated raylets, each of the aforementioned 32 channels having a corresponding raylet. The raylets undergo free-space propagation to the array 310 whereat each raylet is selectively transmitted, attenuated or substantially totally reflected depending upon the control signals generated in the control module 130. Radiation of raylets transmitted or attenuated through the array 310 is received at the multiplexer 330 which combines the radiation to provide output radiation which propagates from the output port of the CCU 50 along the fibre waveguide 100 to the first input port of the second coupler 60.

Client communication traffic received at the add/drop multiplexer 10, more specifically at the interfacing amplifier 260, is amplified and suitably conditioned to drive the DFB laser 250 and amplitude modulate radiation emitted therefrom. The modulated radiation propagates through the fibre waveguide 230 to its associated input port of the combiner 210. The modulated radiation is coupled through the combiner 210 and subsequently through the fibre waveguide 220 to the second input port of the second coupler 60. The second coupler 60 couples radiation at its input ports to provide output radiation at its output port, the output radiation propagating through the fibre waveguide 110 to the input port of the transmitter EDFA 70. The EDFA 70 amplifies the output radiation received thereat to generate corresponding amplified radiation. The amplified radiation is predominantly output at the output port of the transmitter EDFA 70 and launched into the fibre waveguide 20 for further propagation within the system. A small portion, namely in the order of 5%, of the amplified radiation is coupled to the auxiliary port P and then through the fibre waveguide 140 to the detector array 120. The array 120 comprises a wavelength demultiplexer operable to divide components of the amplified radiation into raylets corresponding to the aforementioned channels. Moreover, the detector 120 further includes thirty-two PIN diode photodetectors for detecting radiation present in each raylet and generating electrical output signals indicative of radiation energy in each raylet. The output signals are passed to the control module 130 which monitors energy present in each raylet and continuously adjusts attenuation provided by corresponding liquid crystal cells in the CCU 50 in order to ensure that energy in the raylets is matched from channel-to-channel within an error margin of 10 dB or less. Preferably, the energy in the raylets is matched from channel-to-channel within an error margin of 1 dB or less.

The CCU 50 is controlled by the system so that the cells of the array 310 block raylets of radiation propagating through the CCU 50 having coincident wavelength with the radiation output from the DFB laser 250. Likewise, when additional modulated DFB lasers are optically connected to the combiner 210 and operable to provide modulated radiation thereto, the CCU 50 is also controlled to block raylets of radiation propagating therethrough whose wavelength is coincident with radiation output from said additional modulated DFB lasers. Such blocking is necessary in order to circumvent combining radiation of substantially identical wavelengths at the second coupler 60 which would result in associated communication traffic corruption.

As an option, control signals from the control module 130 can also be connected to radiation amplitude control inputs of the DFB laser 250, and any additional DFB lasers outputting radiation to the second coupler 60. Such connection also enables the control module 130 to perform leveling on radiation added at the add/drop multiplexer 10.

It is to be borne in mind that structures similar to the CCU 50, for example as disclosed in the U.S. Pat. No. 5,414,540, are designed to function as radiation switching components. The inventors of the present invention have appreciated:

(a) that the CCU 50 can be operated to provide continuously-variable attenuation of specific raylets of radiation; and (b) that such a CCU 50 capable of providing variable attenuation is suitable for inclusion in add/drop multiplexers for performing channel leveling therein.

If the CCU 50 were implemented using alternative technology to liquid crystal technology, for example using an array of Mach-Zehnder interferometers configured as variable attenuators, it would not be practically feasible to obtain a radiation blocking performance in the order of 46 dB and yet provide an affordable commercial product.

Unlike prior art communication systems, the present invention enables power equalization, also referred to as power leveling, to be achieved locally at add/drop multiplexers distributed within communication systems, thereby addressing leveling problems experienced in the prior art where leveling at intermediate locations is not provided and where energy differentials between radiation components corresponding to communication channels can arise.

It will be appreciated that modifications can be made to the add/drop multiplexer 10 without departing from the scope of the invention. For example, the CCU 50 can be configured to include more cells and the demultiplexer 300 can be correspondingly designed to split input radiation received at the CCU 50 into more raylets; up to 128 cells is potentially possible for example. Moreover, the splitter 150 can, if required, be connected to more than twelve units similar to the receiver unit 180; likewise, the combiner 210 can be connected to more than twelve units similar to the transmitter unit 240.

If necessary, the PIN diode detector array 120 can be replaced with a tunable filter coupled to a single PIN diode detector, the tunable filter operable to sequentially tune through radiation components corresponding to communication channels present in the radiation output from the transmitter EDFA 70; in such a modified version of the add/drop multiplexer 10, sequential tuning is practicable because radiation energy present in the channels changes relatively gradually with time, ignoring communication traffic modulation and intentional switching of channels, for example due to component ageing.

What we claim is:

1. An add/drop multiplexer for a wavelength division multiplexed (WDM) optical communication system, comprising:
   a) dropping means for selectively diverting at least part of one or more radiation components present in WDM optical radiation received from the system;
   b) a radiation control unit for selectively controlling transmission of the radiation components of the WDM radiation; and
   c) adding means for adding additional radiation components to the radiation components output from the control unit, the radiation control unit being operable to selectively block the radiation components whose wavelengths are coincident with those of the additional radiation components added by the adding means,
   d) said radiation control unit including
      i) filtering means for partitioning the WDM radiation received into one or more radiation components corresponding to WDM communication channels of the system,
      ii) liquid crystal attenuating means for selectively transmitting or attenuating said one or more radiation components,
      iii) combining means for combining the one or more of the radiation components transmitted through the attenuating means to provide combined radiation,
      iv) monitoring means for measuring power present in said one or more of the radiation components included in the combined radiation and generating one or more corresponding radiation component power indicative signals, and
      v) controlling means for receiving said one or more power indicative signals from the monitoring means and selectively controlling attenuation provided by the attenuating means so that the radiation components included in the combined radiation have the same power to within a pre-selected error margin.

2. The multiplexer according to claim 1, wherein the controlling means is further operable to control the adding means so that the power of the additional radiation components added have substantially the same power as the radiation components included in the combined radiation to within the pre-selected margin.

3. The multiplexer according to claim 2, wherein the controlling means is operable to match the power of the one or more radiation components present in the combined radiation and the additional radiation components to within an error margin of 10 dB or less.

4. The multiplexer according to claim 3, wherein the controlling means is operable to match the magnitudes of the one or more radiation components present in the combined radiation and the additional radiation components to within an error margin of 1 dB or less.

5. The multiplexer according to claim 1, wherein the filtering means is operable to partition the radiation received at the control unit into spatially separated raylets, and the attenuating means includes an array of liquid crystal cells, each cell corresponding to an associated raylet and operable to provide selective attenuation or transmission of the raylet.

6. The multiplexer according to claim 1, wherein the monitoring means includes optical filtering means for partitioning radiation received thereat from at least one of the combining means and the adding means into radiation components, and an array of photodetectors for measuring radiation power present in each of the components and generating one or more corresponding output signals indicative of the radiation power present in the radiation components, the one or more output signals for use by the controlling means for controlling the attenuating means.

7. The multiplexer according to claim 1, wherein the monitoring means includes tuneable optical filtering means for serially selecting the radiation components present in radiation received thereat from at least one of the combining means and the adding means, and a photodetector for measuring radiation power present in the selected series of radiation components and generating one or more corresponding output signals indicative of the radiation power present in the selected series, the one or more output signals for use by the controlling means for controlling the attenuating means.

8. The multiplexer according to claim 1, wherein the adding means incorporates one or more modulated distributed feedback lasers for generating the one or more additional radiation components for adding to the combined radiation.

9. The multiplexer according to claim 1, wherein the filtering means incorporates a Bragg grating filter.

10. The multiplexer according to claim 1, and comprising diverting means operable to divert in a range of 5 to 95% of radiation received thereat to the dropping means.

11. The multiplexer according to claim 1, including coupling means for coupling in a range of 5% to 95% of the combined radiation and in a range of 5% to 95% of the additional radiation into radiation for output to the system.

12. The multiplexer according to claim 1, and further comprising optical amplifying means for collectively amplifying the combined radiation and additional radiation components before they are output to the system.

13. The multiplexer according to claim 1, wherein the monitoring means is operable to measure the power present in the radiation components output from said amplifying means.

14. The multiplexer according to claim 1, and further comprising optical amplifying means for amplifying the WDM optical radiation received from the system.

15. The multiplexer according to claim 12, in which the optical amplifying means comprise an erbium doped fiber amplifier (EDFA).

16. A wavelength division multiplexed optical communication system incorporating the add/drop multiplexer according to claim 1.

17. A method of equalizing radiation power in an add/drop multiplexer, the method comprising the steps of:
   a) receiving information-bearing optical radiation at the multiplexer;
   b) partitioning the radiation into radiation components corresponding to communication channels;
   c) selectively attenuating one or more of the radiation components in liquid crystal attenuating means;
   d) combining radiation components transmitted or attenuated through the attenuating means to provide combined radiation;
   e) measuring the combined radiation using monitoring means to determine radiation power present in the one or more radiation components included in the combined radiation and generating one or more corresponding component radiation power indicative signals; and
   f) controlling attenuation provided by the attenuating means in response to the one or more power indicative signals so that radiation components present in the combined radiation are of the same power to within a pre-selected error margin.

18. The method according to claim 17, wherein the one or more radiation components present in the combined radiation are power matched to within an error margin of 10 dB.

* * * * *